(12) United States Patent
Hassan-Ali et al.

(10) Patent No.: US 9,634,728 B2
(45) Date of Patent: Apr. 25, 2017

(54) CONTACTLESS CONNECTOR (71) Applicant: Tyco Electronics Corporation, Berwyn, PA (US)

(72) Inventors: Mudhafar Hassan-Ali, Petaluma, CA (US); Danny Hon Bun Chan, Fremont, CA (US); Jason Larson, Lorenzo, CA (US)

(73) Assignee: TE Connectivity Corporation, Berwyn, PA (US)

( * ) Notice: Subject to any disclaimer, the term of this patent is extended or adjusted under 35 U.S.C. 154(b) by 208 days.

(21) Appl. No.: 14/289,319

(22) Filed: May 28, 2014

(65) Prior Publication Data
US 2015/0349847 A1 Dec. 3, 2015

(51) Int. Cl.
*H04B 5/00* (2006.01)

(52) U.S. Cl.
CPC ......... *H04B 5/0031* (2013.01); *H04B 5/0037* (2013.01)

(58) Field of Classification Search
CPC .......................... H04B 5/0031; H04B 5/0037
USPC ............................................. 455/41.1, 41.2
See application file for complete search history.

(56) References Cited

U.S. PATENT DOCUMENTS

| 4,038,625 | A | 7/1977 | Tompkins et al. |
| 5,272,381 | A | 12/1993 | Millard |
| 7,153,163 | B2 | 12/2006 | Lewis et al. |
| 7,517,222 | B2 | 4/2009 | Rohrbach et al. |
| 2010/0131749 | A1* | 5/2010 | Kim ............ H04M 1/605 713/100 |
| 2011/0076944 | A1* | 3/2011 | Mihota .......... H04L 27/02 455/41.2 |
| 2013/0109317 | A1* | 5/2013 | Kikuchi ........... H04B 7/24 455/41.2 |
| 2013/0115821 | A1* | 5/2013 | Golko ............ H01R 13/516 439/638 |

FOREIGN PATENT DOCUMENTS

| JP | 7-6817 A | 1/1995 |
| JP | 8-30738 A | 2/1996 |
| JP | 2003-82519 A | 3/2003 |

* cited by examiner

Primary Examiner — Xin Jia (57) ABSTRACT

A contactless connector includes an insulative housing having a mating interface configured to be coupled to a connector interface of an electronic device. The housing can be reversibly coupled to the connector interface in a first orientation or in a second orientation oriented 180 degrees relative to the first orientation. A communication circuit board is held within the housing that includes a first connector communication chip and a second connector communication chip configured to define wireless communication channels with corresponding device communication chips of the electronic device in either orientation. A sensor senses the orientation of the housing relative to the connector interface of the electronic device to determine if the housing is in the first orientation or in the second orientation. The mode of operation of the first and second connector communication chips is controlled based on the sensed orientation of the housing.

20 Claims, 5 Drawing Sheets

CONTACTLESS CONNECTOR

BACKGROUND OF THE INVENTION

The subject matter herein relates generally to contactless connectors.

Connectors are known for providing data and power links to electronic devices, such as mobile devices, wearable electronic devices, hand held devices and the like. The connectors supply power to the electronic device, such as to recharge a battery of the electronic device, and/or the connectors transmit data to and/or from the electronic device.

Known connectors for such electronic devices are not without disadvantages. For instance, the connectors typically have unidirectional operation and are required to plug with the electronic devices in a single orientation. Plugging the connectors into the electronic devices in the wrong orientation may lead to customer annoyance, inoperability or potential damage to the connectors or electronic devices. The connectors typically have exposed signal contacts that may be susceptible to damage and deterioration over time. The connectors may have problems with alignment and securing the connectors to the electronic devices, which may require bulky mechanical features for mating, which may be less desirable to some users.

A need remains for a cost effective and reliable connector for electronic devices having an easy-to-use mating and a sleek design.

BRIEF SUMMARY OF THE INVENTION

In one embodiment, a contactless connector is provided including a housing extending between a mating end and a termination end. The housing includes insulative material and has a mating interface at the mating end configured to be coupled to a connector interface of an electronic device. The housing is reversibly coupled to the connector interface in a first orientation or in a second orientation oriented 180 degrees relative to the first orientation. A contactless data communication circuit board is provided within the housing. The contactless data communication circuit board has a first connector contactless data communication chip and a second contactless data connector communication chip. The first and second connector contactless data communication chips are each operable in a mode of operation that is either a transmit mode or a receive mode, wherein, in the first orientation, the first connector contactless data communication chip is configured to define a first wireless data communication channel with a first device contactless data communication chip of the electronic device and the second connector contactless data communication chip is configured to define a second wireless data communication channel with a second device contactless data communication chip of the electronic device. In the second orientation, the first connector contactless data communication chip is configured to define the second wireless data communication channel with the second device contactless data communication chip of the electronic device and the second connector contactless data communication chip is configured to define the first wireless data communication channel with the first device contactless data communication chip of the electronic device. A sensor is configured to sense the orientation of the housing relative to the connector interface of the electronic device to determine if the housing is in the first orientation or in the second orientation. The mode of operation of the first and second connector contactless data communication chips is controlled based on the sensed orientation of the housing.

Optionally, when the sensors senses that the housing is in the first orientation, the first connector contactless data communication chip is operated in the transmit mode and the second connector contactless data communication chip is operated in the receive mode, and wherein, when the sensor senses that the housing is in the second orientation, the first connector contactless data communication chip is operated in the receive mode and the second connector contactless data communication chip is operated in the transmit mode.

Optionally, at least one of the first connector contactless communications chip or the second connector contactless data communication chip may define the sensor. Optionally, the sensor may be a proximity sensor. Optionally, the sensor may be a current direction sensor.

Optionally, the communication circuit board may include a first surface and a second surface. The first connector contactless data communication chip may be mounted to the first surface and the second connector contactless data communication chip may be mounted to the second surface.

Optionally, the housing may include an alignment element at the mating interface configured to align the housing with the electronic device in the first orientation and in the second orientation. The alignment element may include a projection extending forward of a front of the housing. The first and second connector communication chips may be at least partially received inside of the projection.

Optionally, the housing may include a first side and a second side opposite the first side. First and second coupling elements may be positioned at the first and second sides, respectively. The first and second coupling elements may be magnetically coupled to corresponding device coupling elements of the electronic device.

Optionally, first and second power terminals may be provided at the first and second sides, respectively. The first and second power terminals may be electrically coupled to corresponding device power terminals of the electronic device to supply power to the electronic device. The first and second power terminals may be configured to supply power in the first and second orientations. A power circuit may supply power to the first and second power terminals. The sensor may be operably coupled to the power circuit to switch polarity of the first and second power terminals based on the sensed orientation of the housing. In the first orientation, the first power terminal may have a positive polarity and the second power terminal may have a negative polarity. In the second orientation, the first power terminal may have a negative polarity and the second power terminal may have a positive polarity.

Optionally, the contactless connector may include a first side positive power terminal and a first side negative power terminal positioned at the first side of the housing and a second side positive power terminal and second side negative power terminal positioned at the second side of the housing. The power terminals may be electrically coupled to corresponding device power terminals of the electronic device to supply power to the electronic device. A positive wire and a negative wire may be provided in the housing. The positive wire may be spliced and electrically coupled to the first side positive power terminal and the second side positive power terminal. The negative wire may be spliced and electrically coupled to the first side negative power terminal and the second side negative power terminal.

In another embodiment, a contactless connector is provided that includes a housing extending between a mating end and a termination end. The housing has a mating interface at the mating end configured to be coupled to a connector interface of an electronic device. The housing has a first side and a second side opposite the first side. The housing is reversibly coupled to the connector interface in a first orientation or in a second orientation oriented 180 degrees relative to the first orientation. The contactless connector includes first and second coupling elements at the first and second sides, respectively, that are coupled to corresponding coupling elements of the electronic device. The contactless connector includes first and second power terminals at the first and second sides, respectively that are electrically coupled to corresponding device power terminals of the electronic device to supply power to the electronic device. The first and second power terminals are configured to supply power in the first and second orientations. The contactless connector includes a communication circuit board held within the housing, the communication circuit board having at least one connector contactless data communication chip configured to define a wireless communication channel with a device contactless data communication chip of the electronic device. The at least one connector contactless data communication chip is configured to communicate with the electronic device in the first and second orientations.

DETAILED DESCRIPTION OF SPECIFIC EMBODIMENTS OF THE INVENTION

Figure 1:
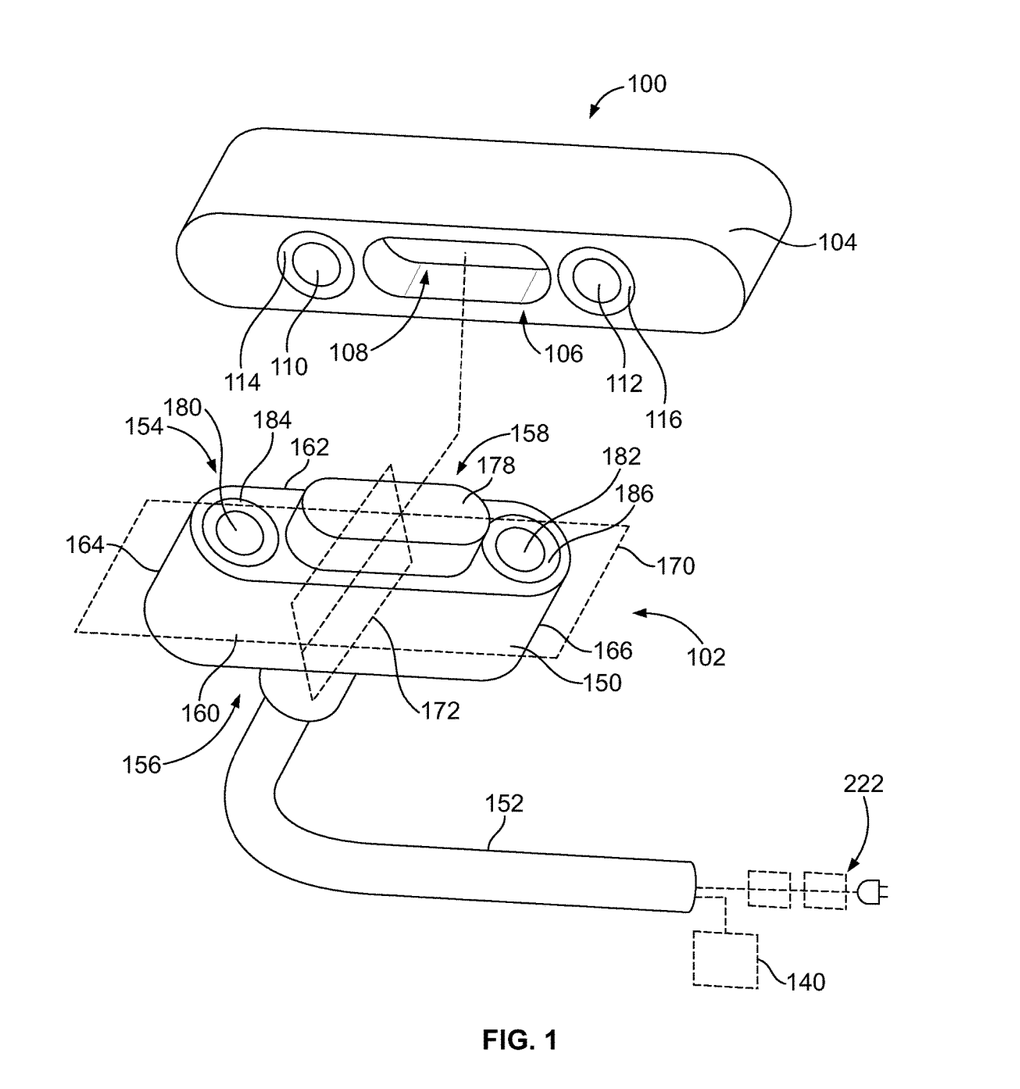
FIG. 1 illustrates an electronic device and contactless connector formed in accordance with an exemplary embodiment.

FIG. 1 illustrates an electronic device 100, only a portion of which is shown, and contactless connector 102 formed in accordance with an exemplary embodiment. The contactless connector 102 is used to power the electronic device 100 and/or transfer data to and/or from the electronic device 100. The electronic device 100 communicates wirelessly with the contactless connector 102 without the need for abutting electrical contacts for the data transfer. For example, the electronic device 100 may communicate electromagnetically, inductively, capacitively or by other means. For purposes of the present disclosure, the term "contactless data communication" or "contactless" is used to mean data communication provided without use of conductive contact terminals requiring physical and electrical connection to transfer data signals to associated conductive contact terminals in a mating connector. Optionally, the electronic device 100 may communicate data signals via radio frequency ("RF") with the contactless connector 102. For purposes of the present disclosure, the term "RF" is used broadly to include a wide range of electromagnetic transmission frequencies including, for instance, those falling within the radio frequency, microwave or millimeter wave frequency ranges. As described further below, the data communication may be one way communication in some embodiments or duplex or two way communication in other embodiments.

The electronic device 100 may be any type of electronic device. For example, the electronic device 100 may be a mobile device. According to other embodiments, the electronic device may be a wearable electronic device, such as an athletic watch, a health monitoring device, electronic glasses, electronic goggles, a headset, headphones, fashion electronics, or other clothing or accessories having electronics embedded therein that are wearable by a user. Also, the electronic device 100 may be a hand held device, such as a cellular phone, a tablet, a global positioning system device, or another type of handheld device.

The electronic device 100 includes a device housing 104 having a connector interface 106 at a portion, such as at an end, of the device housing 104. The connector interface 106 may be a separate connector receptacle mechanically installed into the device housing 100 or may be a connector interface seamlessly integrated into the device housing 100, according to various embodiments. In an exemplary embodiment, the electronic device 100 includes an aligning mechanism, mechanical or magnetic securing mechanism, power transfer interface, and contactless data communication interface. In an exemplary embodiment, the contactless connector 102 which is to be mated to the electronic device 100 may be coupled to the electronic device 100 in multiple orientations. For example, the contactless connector 102 may be flipped 180 degrees for a right-side up or an upside down connection with the electronic device 100; the alignment mechanism aligns the contactless connector 102 in either of the two orientations; and the power transfer interface and/or contactless data communication interface also are capable of being connected in either orientation.

In an exemplary embodiment, the alignment mechanism of device 100 includes an alignment element 108. In the illustrated embodiment, the alignment element 108 is an indentation formed in the device housing 104. Other types of alignment elements 108 may be provided in alternative embodiments. In the illustrated embodiment, the alignment element 108 is a symmetrically oblong and oval shaped indentation able to mate with the contactless connector 102 in multiple orientations. The alignment element 108 provides physical alignment between the contactless connector 102 and the electronic device 100 for enabling data and power connection therebetween. The alignment element 108 may come in different sizes and shapes in alternative embodiments. For example, multiple and/or differently shaped indentations may be provided in alternative embodiments. Rather than an indentation, the alignment element 108 may include a projection extending from the device housing 104, in other embodiments. Such projection may be sized to fit inside the contactless connector 102 or alternatively may surround an exterior of the contactless connector 102, such as a shroud. In still other embodiments, the alignment element 108 may provide a combination of at least one projection and at least one indentation.

In an exemplary embodiment, the electronic device 100 includes at least one mechanical or magnetic securing mechanism fastening the contactless connector 102 to the electronic device 100. In the illustrated embodiment, the mechanical securing mechanism of the electronic device 100 includes a first device coupling element 110 and a second device coupling element 112. The first and second device coupling elements 110, 112 are arranged on opposite sides of the alignment element 108. In an exemplary embodiment, the first and second device coupling elements 110, 112 are magnetic elements. Optionally, the first and second device coupling elements 110, 112 may be ferromagnetic elements when permanent magnets are used as coupling elements in the contactless connector. Alternatively, the first and second device coupling elements 110, 112 may be permanent magnets when ferromagnetic elements are used as the coupling elements in the contactless connector. Other types of coupling elements 110, 112, such as clips, latches, press-fit or interference fit components, Velcro, removably attachable adhesive, or other types of securing mechanisms may be used in alternative embodiments. In an exemplary embodiment, the contactless connector 102 is able to be coupled to the first and second device coupling elements 110, 112 in multiple orientations.

In an exemplary embodiment, the electronic device 100 includes a power transfer interface having at least one power terminal for transferring power between the electronic device 100 and the connector 102. The power transfer interface may enable the supply of power to the electronic device 100 through connector 102 coupled therebetween from a host device (such as a laptop or desktop computer), and/or the power transfer interface may enable the supply of power from the electronic device 100 through the connector 102. In the illustrated embodiment, the electronic device 100 includes a first device power terminal 114 and a second device power terminal 116. The first and second device power terminals 114, 116 are positioned on opposite sides of the alignment element 108. Other positions are possible in alternative embodiments. Optionally, the first and second device power terminals 114, 116 may be positioned adjacent the first and second device coupling elements 110, 112. The power terminals 114, 116 are electrically isolated from the coupling elements 110, 112. The power terminals 114, 116 are contact terminals made of conductive material such as metals, conductive polymers, conductive nanoparticles, and the like. Alternatively, the power terminals 114, 116 may be capacitive power terminals that may capacitively charged.

The first and second power terminals 114, 116 may receive and/or surround the first and second coupling elements 110, 112. For example, in the illustrated embodiment, the first and second device power terminals 114, 116 are hollow cylindrically shaped contacts coaxially surrounding the first and second device coupling elements 110, 112, respectively, which are cylindrically shaped magnetic elements. In other embodiments, the coupling elements 110, 112 may be conical or cup shaped magnetic elements that are nested within power terminals 114, 116 which are shaped to surround the side surfaces of coupling elements 110, 112. Other arrangements are possible in alternative embodiments.

The first and second device power terminals 114, 116 are configured to be electrically connected to the contactless connector 102 in multiple orientations. A power circuit of the electronic device 100 is connected to the first and second device power terminals 114, 116, and the power circuit may be electrically connected to another component within the electronic device 100, such as a battery (not shown). Optionally, the first device power terminal 114 defines an anode and the second device power terminal 116 defines a cathode. Alternatively, the first and second device power terminals 114, 116 may be able to switch polarity, such as by using relays in the power circuit.

Figure 2:
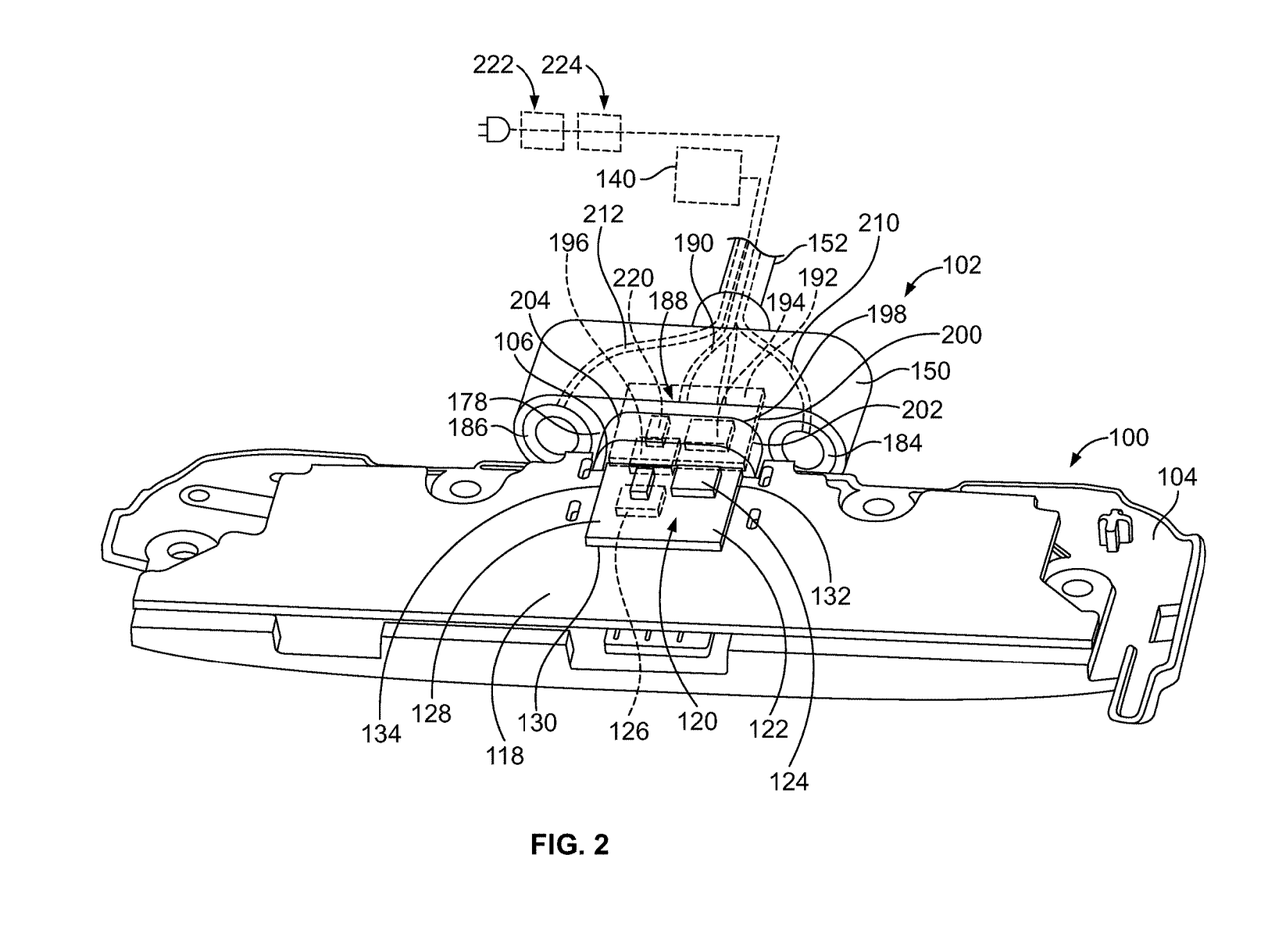
FIG. 2 is a partial view of the electronic device showing the contactless connector coupled thereto, according to the embodiment of FIG. 1.

FIG. 2 is a partial view of the electronic device 100 showing the contactless connector 102 coupled to the connector interface 106 of the electronic device 100. A portion of the device housing 104 has been removed to illustrate components of the electronic device 100 and to show the contactless connector 102 coupled thereto. The electronic device 100 includes a device circuit board 118 within the device housing 104. Any type of electronic component may be mounted to the device circuit board 118, such as a memory, processor, battery, sensor, antenna, communication chip, and the like. Multiple device circuit boards may be provided inside the device housing 104. According to various embodiments, the first and second device power terminals 114, 116 (shown in FIG. 1) may be electrically connected to the device circuit board 118; may be directly terminated to the device circuit board 118, such as by soldering to corresponding pads on the device circuit board 118; or alternatively, the first and second device power terminals 114, 116 may be electrically connected to the device circuit board 118 by wires or other types of electrical connections. Alternatively, the first and second device power terminals 114, 116 may be electrically connected to a battery separate from the device circuit board 118.

In an exemplary embodiment, the electronic device 100 includes a contactless data communication module 120 within the device housing 104. Optionally, the contactless data communication module 120 may be electrically connected to the device circuit board 118. The contactless data communication module 120 includes a circuit board 122 having one or more device contactless data communication chips terminated thereto. According to different embodiments, the circuit board 122 may be a separate board integrated as part of the connector interface 106, or the device contactless data communication chips may be on the device circuit board 118 when connector interface 106 is an integrated part of the device housing.

In the illustrated embodiment, the contactless data communication module 120 includes a first device communication chip 124 and a second device communication chip 126 (shown in phantom in FIG. 2). In an exemplary embodiment, the first device communication chip 124 is a contactless transmit chip configured to transmit wirelessly data from the electronic device 100 while the second device communication chip 126 is a contactless receive chip configured to receive wirelessly data from the contactless connector 102. Alternatively, one or both of the device communication chips 124, 126 may be transceiver chips configured to both wirelessly transmit and receive data. The contactless data communication chips 124, 126 may include or be electrically coupled to antennas, inductive couplers or capacitive couplers through the alignment mechanism for data communication with the contactless connector 102.

The first device communication chip 124 is mounted to a first surface 128 of the circuit board 122 and the second device communication chip 126 is mounted to a second surface 130 of the circuit board 122. Optionally, the first and second device communication chips 124, 126 may be laterally offset such that the device communication chips 124, 126 are staggered. For example the first device communication chip 124 may be positioned closer to a first side 132 of the circuit board 122 and the second device communication chip 126 may be positioned closer to a second side 134 of the circuit board 122. Optionally, neither device communication chip 124, 126 straddles a center line of the circuit board 122. Alternatively, one or both of the device communication chips 124, 126 may straddle the center line of the circuit board 122. Optionally, rather than being offset, the first and second device communication chips 124, 126 may be vertically aligned with one another on the opposite first and second surfaces 128, 130.

In an alternative embodiment, rather than having the first and second device communication chips 124, 126 on opposite surfaces 128, 130, the circuit board 122 may have both device communication chips 124, 126 on the first surface 128 or on the second surface 130. In other alternative embodiments, the data communication module 120 may include more than two device communication chips 124, 126.

With reference back to FIG. 1, the contactless connector 102 may be provided as a cable connector according to a specific embodiment that is coupled to a host device 140, which may have access to a power source and supply power to the contactless connector 102. The contactless connector 102 includes a housing 150 and a cable 152 extending from the housing 150. The housing 150 extends between a mating end 154 and a termination end 156. Optionally, the termination end 156 may define a cable end configured to be terminated to an end of the cable 152; however the termination end may be terminated to other components, such as a peripheral device, such as a docketing station. In the illustrated embodiment, the termination end 156 defines a cable end and will be described herein as a cable end 156. The cable 152 extends from the cable end 156 of the housing 150. Although described in connection with a specific embodiment, the connector 102 also may be terminated to a cable that is pluggable directly into a power socket if contactless data communication chips are not provided. The connector 102 in other embodiments may be terminated to another peripheral device that can be coupled to the connector interface 106 of the electronic device 100 so that the peripheral device may be powered by the electronic device 100 or the peripheral device (e.g. docking station) may power the electronic device 100.

The housing 150 has a mating interface 158 at the mating end 154. The mating interface 158 is configured to be coupled to the connector interface 106 of the electronic device 100. The housing 150 and mating interface 158 are configured to be reversibly coupled to the connector interface 106 in a first orientation or in a second orientation, which may be oriented 180 degrees relative to the first orientation. The housing 150 includes an insulative material having been molded to provide the appropriate shape, including the mating interface 158, such that there are no exposed data contacts and such that the contact surfaces of the power terminals and coupling elements of connector 102 as described below are configured to be flush with a surface of the housing 150.

The housing 150 includes a first end 160 and a second end 162 opposite the first end 160. The housing 150 includes a first side 164 and a second side 166 opposite the first side 164. In the illustrated embodiment, the first and second sides 164, 166 are curved between the first and second ends 160, 162. In the illustrated embodiment, the first end 160 defines a top of the housing 150 and the second end 162 defines a bottom of the housing 150. However, the contactless connector 102 may be flipped or turned over and mated with the connector interface 106 of the electronic device 100 in an upside down orientation such that the first end 160 defines the bottom of the housing 150 and the second end 162 defines the top of the housing 150.

The contactless connector 102 may be physically symmetrical across a horizontal plane 170 and/or a vertical plane 172 extending through the center lines of the contactless connector 102. According to a specific embodiment, the connector 102 is terminated to the cable 152 at the cable end 156 at the intersection of the horizontal plane 170 and vertical plane 172. In other embodiments, the connector 102 may be terminated to the cable end 156 of cable 152 in any one of the quadrants formed by the intersection of the planes 170 and 172. On other embodiments, the cable end 156 may be at one of the sides 166, 164 or ends 160, 162 rather than opposite the mating end 154. The contactless connector 102 may be flipped about the horizontal plane 170 and/or the vertical plane 172 to change the mating orientation of the contactless connector 102 with the connector interface 106 of electronic device 100, according to a specific embodiment.

In an exemplary embodiment, the contactless connector 102 includes an alignment mechanism; mechanical or magnetic securing mechanism, a power transfer interface; and a contactless data communication interface that are complementary to counterparts of the connector interface 106 of the electronic device 100. Accordingly, in an exemplary embodiment, the contactless connector 102 may be coupled to the electronic device 100 in multiple orientations. For example, the contactless connector 102 may be flipped 180 degrees for a right-side up or an upside down connection with the connector interface 106 of the electronic device 100, the alignment mechanism aligns the contactless connector 102 in either orientation, and the power transfer interface and contactless data communication interface are each flush with surfaces of the housing 150 to enable physical contact with counterparts in connector 106 and are capable of being connected in either orientation to the connector interface 106.

In an exemplary embodiment, the alignment mechanism of contactless connector 102 includes an alignment element 178 complementary to the alignment element 108 for aligning the contactless connector 102 with the connector interface 106 of the electronic device 100. The alignment element 178 is sized and shaped for mating with the alignment element 108. In the illustrated embodiment, the alignment element 178 is designed to fit in the indentation defining the alignment element 108 in both the first orientation and the second orientation. In the illustrated embodiment, the alignment element 178 is a projection that extends forward from the housing 150. As described above in relation to connector interface 106 of the electronic device 100, other types of alignment elements 178 that are counterparts to the alignment elements 108 may be provided in alternative embodiments. In the illustrated embodiment, the alignment element 178 is an oblong and oval shaped projection receivable in the alignment element 108 in multiple orientations. The alignment element 178 may come in different sizes and shapes in alternative embodiments. For example, the alignment element 178 may be an indentation, be multiple indentations, have multiple projections or a combination of projection and indentations according to various alternative embodiments, to mate with the connector interface 106.

In an exemplary embodiment, the contactless connector 102 includes at least one mechanical or magnetic securing mechanism. In the illustrated embodiment, the contactless connector 102 includes a first coupling element 180 and a second coupling element 182. The first and second coupling elements 180, 182 are arranged on opposite sides of the alignment element 178. In an exemplary embodiment, the first and second coupling elements 180, 182 are magnetic elements. The first and second coupling elements 180, 182 may be permanent magnets, or ferromagnetic elements. Other types of coupling elements 180, 182 may be used in alternative embodiments, such as clips, latches, press-fit or interference fit components, Velcro, removably attachable adhesive, or other types of securing mechanisms.

The first and second coupling elements 180, 182 of connector 102 are configured to be coupled to the first and second device coupling elements 110, 112 of connector interface 106 in multiple orientations. In the first orientation, the first coupling element 180 is aligned with and coupled to the first device coupling element 110, and the second coupling element 182 is aligned with and coupled to the second device coupling element 112. In the second orientation, the first coupling element 180 is aligned with and coupled to the second device coupling element 112, and the second coupling element 182 is aligned with and coupled to the first device coupling element 110. The coupling elements, 110, 112, 180, 182 cooperate to mechanically or magnetically attach or secure the contactless connector 102 to the connector interface 106 of the electronic device 100. In an exemplary embodiment, the first and second coupling elements 180, 182 are magnetically coupled to the first and second device coupling elements 110, 112.

In an exemplary embodiment, the contactless connector 102 includes at least one power terminal for transferring power between the connector 102 and connector interface 106 of the electronic device 100. In the illustrated embodiment, the contactless connector 102 includes a first power terminal 184 and a second power terminal 186. The power terminals 184, 186 are contact terminals made of conductive material such as metals, conductive polymers, conductive nanoparticles, and the like. The first and second device power terminals 184, 186 may receive and/or surround the first and second device coupling elements 180, 182. For example, in the illustrated embodiment, the first and second device power terminals 184, 186 may be hollow cylindrically shaped contacts coaxially surrounding the first and second device coupling elements 180, 182, respectively, which are cylindrically shaped magnetic elements. In other embodiments, the coupling elements 180, 182 may be conical or cup shaped magnetic elements that are nested within power terminals 184, 186 shaped to surround the side surfaces of coupling elements 180, 182. In these various embodiments, the faces of the coupling elements and surrounding power terminals of connector 102 are flush at a surface of the housing 150 to allow for direct physical contact when mated with their counterparts at the connector interface 106 of the electronic device 100. The device power terminals 184, 186 are electrically isolated from the device coupling elements 180, 182.

The first and second power terminals 184, 186 are positioned on opposite sides of the alignment element 178. Other positions are possible in alternative embodiments. Optionally, the first and second power terminals 184, 186 may be positioned adjacent the first and second coupling elements 180, 182. The first and second power terminals 184, 186 are configured to be electrically connected to the first and second device power terminals 114, 116 in multiple orientations, in a specific embodiment. A power circuit 222 of the contactless connector 102 is connected to the first and second power terminals 184, 186, and the power circuit 222 may be electrically connected to another component within the electronic device 100, such as a battery (not shown). Optionally, the first and second power terminals 184, 186 may be able to switch polarity, such as by using solid-state relays in the power circuit 222.

Returning to FIG. 2, some internal components of the contactless connector 102 are illustrated in phantom. Optionally, the contactless connector 102 may include a main circuit board (not shown) held therein, wherein various components are electrically connected to the main circuit board.

In an exemplary embodiment, the first power terminal 184 is electrically connected to a first power wire 210 and the second power terminal 186 is electrically connected to a second power wire 212. The power wires 210, 212 extend through the cable 152. The power wires 210, 212 may be electrically connected to a power source at the other end of the cable 152. In an alternative embodiment, rather than being directly connected to the power wires 210, 212, the power terminals 184, 186 may be electrically connected to a circuit board (not shown) housed within the housing 150. The power wires 210, 212 may be terminated to such circuit board and power routed to the power terminals 184, 186 by the circuit board.

In the illustrated embodiment shown in FIGS. 1 and 2, the flow of current through the power wires 210, 212 and power terminals 184, 186 may be controlled and switched depending on the orientation of the contactless connector 102 with the connector interface 106 of the electronic device 100. For example, because the first device power terminal 114 defines an anode and a second device power terminal 116 defines a cathode in the connector interface 106, the polarity of the first and second power terminals 184, 186 in the connector 102 needs to be reversed when the contactless connector 102 is changed between the first orientation and the second orientation. The contactless connector 102 may include circuitry or electrical components that allow the power supply to be switched to change the polarity of the first and second power terminals 184, 186. For example, a switching circuit may be provided near the power source at the other end of the cable 152, and the switching circuit may include relays or other electronic components that control the current flow to the first and second power wires 210, 212.

In an exemplary embodiment, the contactless connector 102 includes a contactless data communication module 188 within the housing 150. Optionally, the data communication module 188 may be electrically connected to the main circuit board 192 of the connector 102. The contactless data communication module 188 includes at least one antenna (or inductive or capacitive coupler), one or more contactless data communication chips coupled thereto, and a circuit board 192 having the chips thereon. One or more data wires 190 extend through the cable 152 and are terminated to the circuit board 192 and/or the contactless data communication chips. Data signals are transmitted along the data wires 190, such as from the host device 140 or from the electronic device 100.

In the illustrated embodiment, the contactless data communication module 188 includes a first connector communication chip 194 and a second connector communication chip 196. The first and second connector communication chips 194, 196 are configured to be aligned with, and communicate wirelessly with, the first and second device communication chips 124, 126. The first and second connector communication chips 194, 196 are positioned in close proximity to the first and second device communication chips 124, 126, such as by positioning the first and second connector communication chips 194, 196 in the projection defining the alignment element 178. As such, portions of the first and second connector communication chips 194, 196 may extend into the electronic device 100 when the connector interface 106 has an alignment element 108 formed as an indentation.

In an exemplary embodiment, the contactless data communication chips 194, 196 of the connector 102 may be transceiver communication chips operable in a transmit mode and a receive mode for the contactless data communication (and the mating connector interface of the electronic device 100 can have either dedicated transmit and receive chips since the connector 102 transceiver chips are adjustable depending on orientation, or transceiver chips). In an alternative embodiment, rather than transceiver communication chips, the connector contactless data communication chips 194, 196 may be either dedicated transmit chips or dedicated receive chips (and the mating connector interface of the electronic device 100 must have transceiver chips to adjust to any orientation change of the connector 102).

For the embodiment where transceiver chips are used in the connector 102, in the first orientation, the first connector communication chip 194 is configured to define a first wireless communication channel with the first device communication chip 124, and the second connector communication chip 196 is configured to define a second wireless communication channel with the second device communication chip 126. However, in the second orientation, the first connector communication chip 194 is configured to define the second wireless communication channel with the second device communication chip 126, and the second connector communication chip 196 is configured to define the first wireless communication channel with the first device communication chip 124.

The first connector communication chip 194 is mounted to a first surface 198 of the circuit board 192, and the second connector communication chip 196 is mounted to a second surface 200 of the circuit board 192. Optionally, the first and second connector communication chips 194, 196 may be laterally offset such that the connector communication chips 194, 196 are staggered. For example the first connector communication chip 194 may be positioned closer to a first side 202 of the circuit board 192 and the second connector communication chip 196 may be positioned closer to a second side 204 of the circuit board 192. Optionally, neither connector communication chip 194, 196 straddles a center line of the circuit board 192. Alternatively, one or both of the connector communication chips 194, 196 may straddle the center line of the circuit board 192. Optionally, rather than being offset, the first and second connector communication chips 194, 196 may be vertically aligned with one another on the opposite first and second surfaces 198, 200. In an exemplary embodiment, the circuit board 192 is aligned along the horizontal plane 170 such that when the contactless connector 102 is flipped over in the first orientation or in the second orientation, the circuit board 192 remains aligned with the circuit board 122, such as to align the connector communication chips 194, 196 with the device communication chips 124, 126.

In an alternative embodiment, rather than having the first and second connector communication chips 194, 196 on opposite surfaces 198, 200, the circuit board 192 may have both connector communication chips 194, 196 on the first surface 198 or on the second surface 200. In such embodiment, the circuit board 192 is offset with respect to the horizontal plane 170 such that the connector communication chips 194, 196 remain aligned with the device communication chips 124, 126 when the contactless connector 102 is in the first orientation or in the second orientation. In other alternative embodiments, the data communication module 188 may include more than two connector communication chips 194, 196.

Optionally, the contactless connector 102 and/or the electronic device 104 may include a radio frequency (RF) absorber to reduce interchannel cross talk between transmission lines or channels defined by the communication chips 124, 126, 194, 196. Optionally, the contactless connector 102 and/or the electronic device 104 may include an electro-magnetic interference (EMI) shield to reduce any EMI interference or susceptibility between transmission lines or channels defined by the communication chips 124, 126, 194, 196.

In an exemplary embodiment, the contactless connector 102 includes a sensor 220 configured to sense the orientation of the housing 150 and contactless connector 102 relative to the connector interface 106 of the electronic device 100 to determine if the housing 150 and contactless connector 102 are in the first orientation or in the second orientation. In an exemplary embodiment where transceiver chips are used for full duplex data communication, the mode of operation of the first and second connector communication chips 194, 196 may be controlled based on the sensed orientation of the housing 150 and contactless connector 102. For example, if the sensor 220 senses that the housing 150 and contactless connector 102 are in the first orientation, the first connector communication chip 194 is operated in the receive mode because the first connector communication chip 194 is aligned with the first device communication chip 124, which is a transmit chip, to provide the first wireless data communication channel; and the second connector communication chip 196 is operated in the transmit mode because the second connector communication chip 196 is aligned with the second device communication chip 126, which is a receive chip, to provide the second wireless data communication channel. Similarly, if the sensor 220 senses that the housing 150 and contactless connector 102 are in the second orientation, the first connector communication chip 194 is operated in the transmit mode because the first connector communication chip 194 is aligned with the second device communication chip 126, which is a receive chip, to provide the second wireless data communication channel; and the second connector communication chip 196 is operated in the receive mode because the second connector communication chip 196 is aligned with the first device communication chip 124, which is a transmit chip, to provide the first wireless data communication channel.

It should be recognized that in a specific embodiment where transceiver chips are not used in the connector 102 and instead a dedicated transmit chip and a dedicated receive chip are used, then the connector interface 106 of the electronic device 100 needs to have transceiver chips in order to adjust for different orientations of the contactless connector 102. In another specific embodiment, such as where only one transceiver chip is used in the connector 102, a half-duplex communication may be provided so that transmit data and receive data are sent across the contactless data communication channel.

In an exemplary embodiment, the power circuit 222 of the contactless connector 102 also may be controlled based on the sensed orientation of the housing 150 and the contactless connector 102. For example, the polarity of the first and second power terminals 184, 186 may be switched based on the sensed orientation. The sensor 220 may be operably coupled to the power circuit 222 to switch polarity of the first and second power terminals 184, 186 based on the sensed orientation of the connector interface 106 or housing 150 and contactless connector 102. For example, when the sensor 220 senses that the connector interface 106 or the housing 150 and contactless connector 102 are in the first orientation, the first power terminal 184 has a positive polarity because the first power terminal 184 is coupled to the first device power terminal 114; and the second power terminal 186 has a negative polarity because the second power terminal 186 is coupled to the second device power terminal 116. However, when the sensor 220 senses that the housing 150 and the contactless connector 102 are in the second orientation, the first power terminal 184 has a negative polarity because the first power terminal 184 is coupled to the second device power terminal 116; and the second power terminal 186 has a positive polarity because the second power terminal 186 is coupled to the first device power terminal 114.

In an exemplary embodiment, the power circuit 222 includes a switching circuit 224 that switches the polarity of the power wires 210, 212 and the power terminals 184, 186. In the illustrated embodiment, the switching circuit 224 is provided remote from the housing 150 such as near the power supply. Alternatively, the switching circuit 224 may be contained within the housing 150, such as on the circuit board in the housing 150. The sensor 220 may be connected at the switching circuit 224 by one of the data wires 190. The data wire 190 may be a dedicated data wire between the sensor 220 and the switching circuit 224. Alternatively, the sensor data may be transmitted along one of the data wires 190 electrically connected to the connector communication chips 194, 196. In other alternative embodiments, the data from the sensor 220 relating to the orientation of the housing 150 and contactless connector 102 may be transmitted along the first power wire 210 and/or the second power wire 212.

In the illustrated embodiment, the sensor 220 is a separate sensor contained with the housing 150; however, the power terminals 184, 186 and/or the connector contactless data communication chips 194, 196 may be used as sensors in alternative embodiments to determine the orientation of the housing 150 and the contactless connector 102. The sensor 220 may be any type of sensor, such as a proximity sensor that interacts with a corresponding component within the electronic device 100. For example, the sensor 220 may be a magnetic sensor, such as anisotropic magneto resistance ("AMR") sensor. Alternatively, the sensor may be another type of proximity sensor such as a Reed switch, a Hall Effect sensor, or another type of proximity sensor. The sensor may be another type of sensor, such as a current direction sensor.

In alternative embodiments, the sensor 220 may comprise the power circuit 222. For example, the first power terminal 184 and/or the second power terminal 186 may define the sensor 220. For example, the power circuit 222 may sense the load on the power terminals 184, 186, on the power wires 210, 212, or on other components of the power circuit 222 to determine the orientation and then reverse the power circuit 222 if needed.

In other alternative embodiments, the data communication module 188 may define the sensor 220. For example, the first connector communication chip 194 and/or the second connector communication chip 196 may be used to determine the orientation of the housing 150 and contactless connector 102. For example, both connector communication chips 194, 196 may be transceiver chips operable in a receive or transmit mode and the data communication module 188 may determine the orientation of the contactless connector 102 based on which one of the connector communication chips 194, 196 receives data from the electronic device 100. Such data may be relayed to the power circuit 222 to control the DC current of the power circuit 222, such as to reverse or switch the polarity of the power terminals 184, 186.

Figure 3:
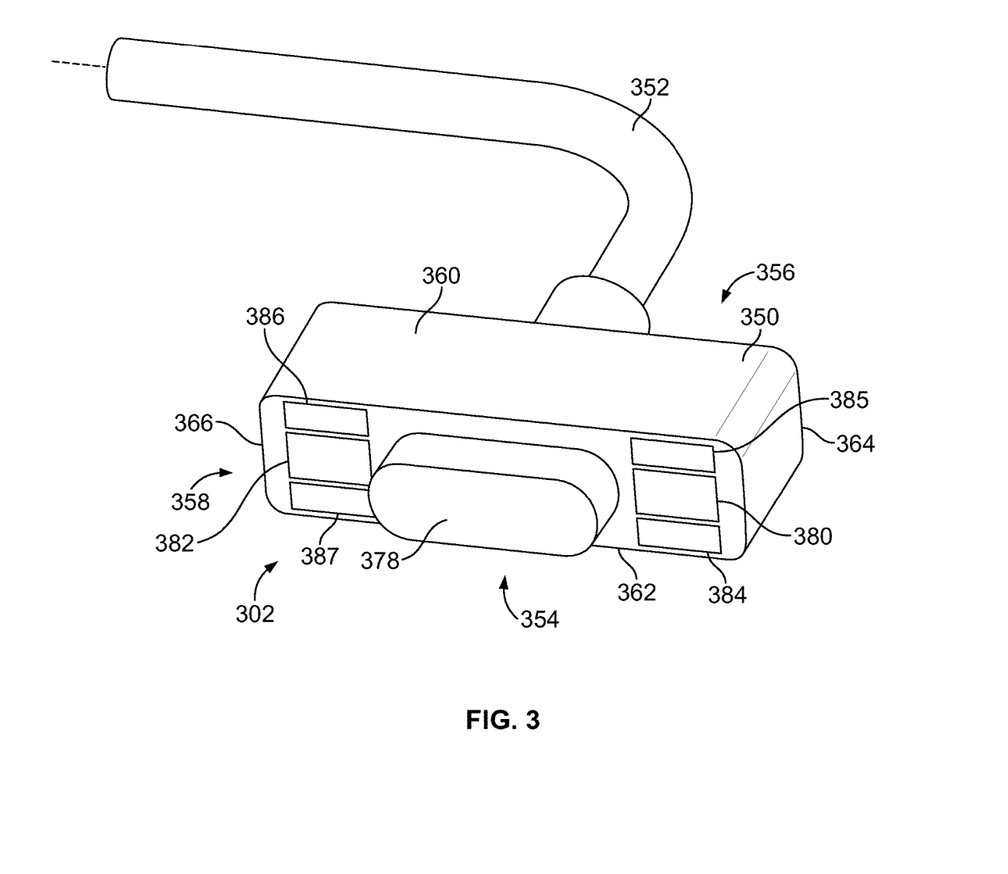
FIG. 3 is a front perspective view of an alternative contactless connector formed in accordance with an exemplary embodiment.
Figure 4:
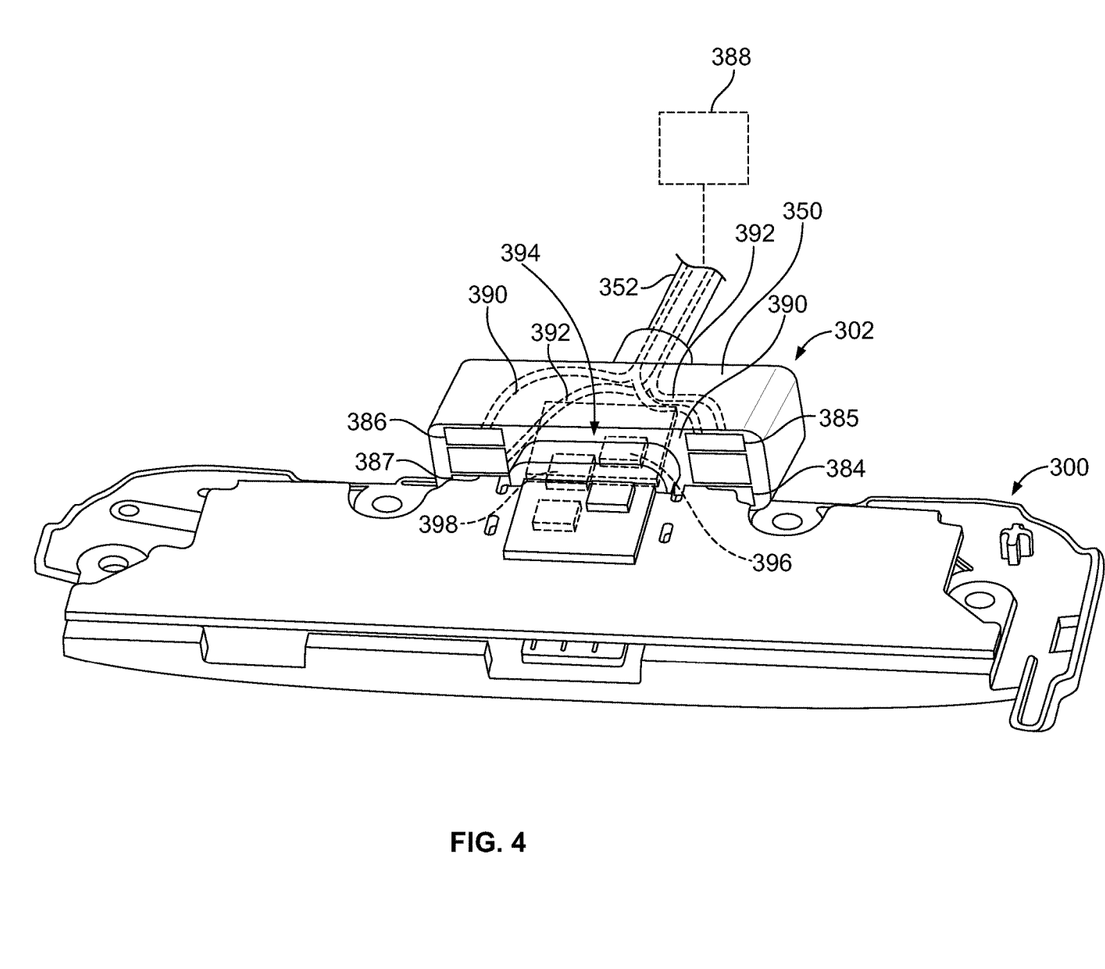
FIG. 4 illustrates the contactless connector coupled to an electronic device, according to the embodiment of FIG. 3.

FIG. 3 is a front perspective view of an alternative contactless connector 302 formed in accordance with an exemplary embodiment. The contactless connector 302 is similar to the contactless connector 102 (shown in FIG. 1); however, the contactless connector 302 includes a different arrangement of power terminals and the housing shape shown differs. Various of the elements of the embodiment of FIGS. 3 and 4 are similar to those of the embodiment of FIGS. 1 and 2 and so are not necessarily described in detail to avoid unnecessary redundancy.

The contactless connector 302 includes a housing 350 and a cable 352 extending from the housing 350. The housing 350 extends between a mating end 354 and a termination end such as a cable end 356. The cable 352 extends from the cable end 356 of the housing 350, according to a specific embodiment. The housing 350 has a mating interface 358 at the mating end 354. The mating interface 358 is configured to be coupled to an electronic device 300 (shown in FIG. 4). The housing 350 and mating interface 358 are configured to be reversibly coupled to the connector interface of the electronic device 300 in a first orientation or in a second orientation, which may be oriented 180 degrees relative to the first orientation.

The housing 350 includes a first end 360 and a second end 362 opposite the first end 360. The housing 350 includes a first side 364 and a second side 366 opposite the first side 364. In the illustrated embodiment, the first and second sides 364, 366 are curved between the first and second ends 360, 362.

In an exemplary embodiment, the contactless connector 302 includes an aligning mechanism such as alignment element 378, a mechanical or magnetic securing mechanism, power transfer interface, and contactless data communication interface. In an exemplary embodiment, the contactless connector 302 may be coupled to the electronic device 300 in multiple orientations. For example, the contactless connector 302 may be flipped 180 degrees for a right-side up or an upside down connection with the electronic device 300. In addition to the mechanical or magnetic securing mechanism, the power transfer interface and contactless data communication interface also are capable of being connected in either orientation to their counterparts in the mating connector interface of the electronic device 300.

In an exemplary embodiment, the alignment mechanism includes an alignment element 378 configured to be mated with the electronic device 300. The alignment element 378 aligns the contactless connector 302 in either orientation to the mating connector interface of the electronic device 300.

The securing mechanism of the contactless connector 302 includes at least one coupling element for mechanically or magnetically securing the contactless connector 302 to the electronic device 300. In the illustrated embodiment, the contactless connector 302 includes a first coupling element 380 and a second coupling element 382. In an exemplary embodiment, the first and second coupling elements 380, 382 are magnetic elements. Other types of coupling elements 380, 382 such as clips, latches, press-fit or interference fit components, Velcro, removably attachable adhesive, or other types of securing mechanisms, may be used in alternative embodiments. The first and second coupling elements 380, 382 are arranged on opposite sides of the alignment element 378. The first and second coupling elements 380, 382 are configured to be coupled to corresponding device coupling elements (not shown) of the mating connector interface of the electronic device 300 in multiple orientations.

The contactless connector 302 includes a first side positive power terminal 384 and a first side negative power terminal 385 positioned at the first side 364 of the housing 350 and a second side positive power terminal 386 and second side negative power terminal 387 positioned at the second side 366 of the housing 350. The power terminals 384, 385, 386, 387 are configured to be electrically coupled to corresponding device power terminals (not shown) of the electronic device 300 to transfer power between the electronic device 300 and connector 302. The first side positive power terminal 384 and the second side positive power terminal 386 are positioned at opposite ends of the housing 350, with the first side positive power terminal 384 at the second end 362 and the second side positive power terminal 386 at the first end 360. Similarly, the first side negative power terminal 385 and second side negative power terminal 387 are positioned at opposite ends of the housing 350, with the first side negative power terminal 385 positioned at the first end 360 of the housing 350 and the second side negative power terminal 387 positioned at the first end 360 of the housing 350. As such, when the contactless connector 302 is flipped between the first and second orientations, the positive power terminals 384, 386 swap positions and the negative power terminals 385, 387 swap positions, thereby allowing in use one positive power terminal and one negative power terminal to couple on either side of the alignment mechanism 378 with the device power terminals. The first side power terminals 384, 385 and second side power terminals 386, 387 are contact terminals made of conductive material such as metals, conductive polymers, conductive nanoparticles, etc. In the illustrated embodiment, the power terminals 384, 385 may be rectangular shaped contacts adjacent on either side of rectangular shaped magnetic element 380; and the power terminals 386, 387 may be rectangular shaped contacts adjacent on either side of rectangular shaped magnetic element 382. The coupling elements 380, 382 are nested between respective power terminals 384, 385 and 386, 387; and the faces of the coupling elements and surrounding power terminals of connector 302 are flush at a surface of the housing 350 to allow for direct physical contact when mated with their counterparts in connector interface of the electronic device 300.

FIG. 4 illustrates the contactless connector 302 coupled to the electronic device 300. Portions of the contactless connector 302 and electronic device 300 have been removed to illustrate the wireless data communication modules therein.

A power circuit 388 of the contactless connector 302 is connected to the power terminals 384, 385, 386, 387. The power circuit 388 includes positive power lines 390 coupled to the positive power terminals 384, 386. The power circuit 388 includes negative power lines 392 coupled to the negative power terminals 385, 387. In an exemplary embodiment, the positive and negative power lines 390, 392 are wires routed through the cable 352 into the housing 350. Optionally, the wires may be spliced within the housing 350 to extend to the positive and negative power terminals 384, 385, 386, 387. Alternatively, each power terminal 384, 385, 386, 387 may have a dedicated wire from the cable 352 terminated thereto. Because two positive power terminals 384, 386 are provided and two negative power terminals 385, 387 are provided, there is no need for switching the polarity of any of the power terminals 384, 385, 386, 387 for reversible mating with the electronic device 300.

In an exemplary embodiment, the contactless connector 302 includes a contactless data communication module 394 (shown in phantom in FIG. 4), which may be similar to the contactless data communication module 188 (shown in FIG. 2). In the illustrated embodiment, the contactless data communication module 394 includes at least one antenna (or inductive or capacitive coupler), one or more contactless data communication chips coupled thereto, and a circuit board 392 having the chips thereon. For example, the module 394 may include a first connector contactless data communication chip 396 and a second connector contactless data communication chip 398. The first and second connector communication chips 396, 398 are configured to be aligned with, and communicate wirelessly with, the corresponding device communication chips of the connector interface of the electronic device 300.

Figure 5:
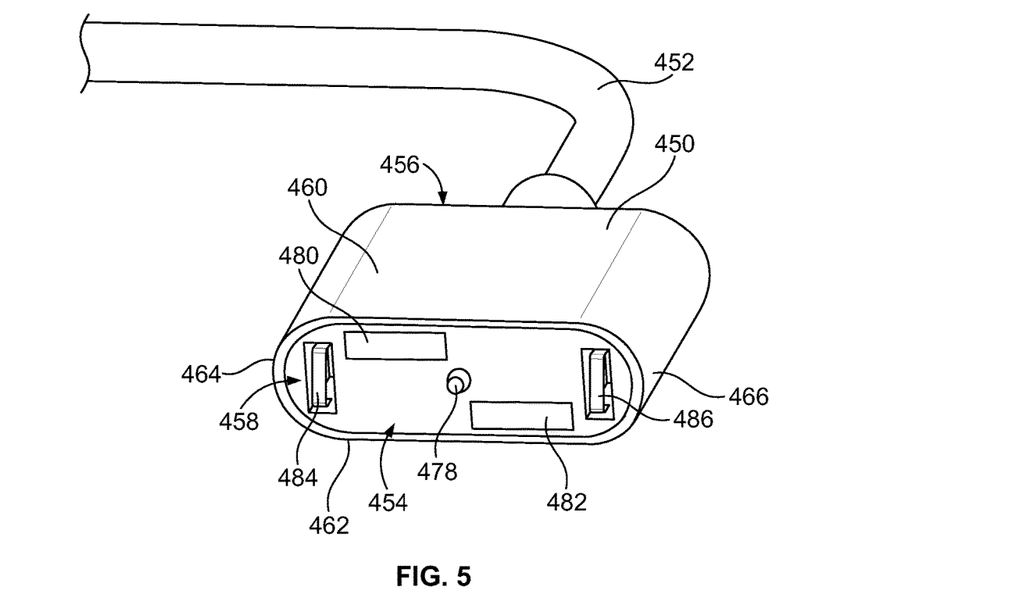
FIG. 5 is a front perspective view of an alternative contactless connector 402 formed in accordance with an exemplary embodiment.
Figure 6:
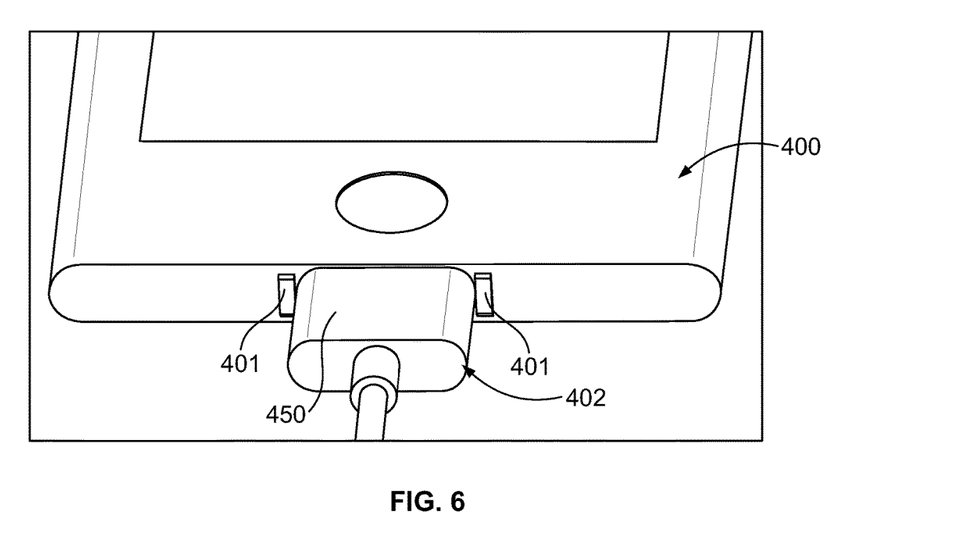
FIG. 6 illustrates the contactless connector shown in FIG. 5 mated with an electronic device.

FIG. 5 is a front perspective view of an alternative contactless connector 402 formed in accordance with an exemplary embodiment. FIG. 6 illustrates the contactless connector 402 mated with an electronic device 400, which may be similar to the electronic device 100. The electronic device 400 includes guide features 401 that align and/or guide mating of the contactless connector 402 with the electronic device 400.

The contactless connector 402 is similar to the contactless connector 102 (shown in FIG. 1); however, the contactless connector 402 includes a different arrangement of coupling elements and power terminals and the housing shape shown differs. Various of the elements of the embodiment of FIGS. 5 and 6 are similar to those of the embodiment of FIGS. 1 and 2 and so are not necessarily described in detail to avoid unnecessary redundancy. The wireless data communication may be similar to the wireless data communication described with respect to the contactless connector 102 and/or 302.

The contactless connector 402 includes a housing 450 and a cable 452 extending from the housing 450. The housing 450 extends between a mating end 454 and a termination end such as a cable end 456. The cable 452 extends from the cable end 456 of the housing 450, according to a specific embodiment. The housing 450 has a mating interface 458 at the mating end 454. The mating interface 458 is configured to be coupled to the electronic device 400 (FIG. 6). The housing 450 and mating interface 458 are configured to be reversibly coupled to a connector interface of the electronic device 400 in a first orientation or in a second orientation, which may be oriented 180 degrees relative to the first orientation.

The housing 450 includes a first end 460 and a second end 462 opposite the first end 460. The housing 450 includes a first side 464 and a second side 466 opposite the first side 464. In the illustrated embodiment, the first and second sides 464, 466 are curved between the first and second ends 460, 462.

In an exemplary embodiment, the contactless connector 402 includes an aligning mechanism, a mechanical or magnetic securing mechanism, power transfer interface, and contactless data communication interface. In an exemplary embodiment, the contactless connector 402 may be coupled to the electronic device 400 in multiple orientations. For example, the contactless connector 402 may be flipped 180 degrees for a right-side up or an upside down connection with the electronic device 400. In addition to the mechanical or magnetic securing mechanism, the power transfer interface and contactless data communication interface also are capable of being connected in either orientation to their counterparts in the mating connector interface of the electronic device 400.

In an exemplary embodiment, the alignment mechanism includes an alignment element 478 configured to be mated with the electronic device 400. The alignment element 478 aligns the contactless connector 402 in either orientation to the mating connector interface of the electronic device 400. In the illustrated embodiment, the alignment element 478 is a cylindrical post extending forward from the front of the housing 450; however other shaped posts or other types of alignment elements, such as an opening, may be used in alternative embodiments.

The securing mechanism of the contactless connector 402 includes at least one coupling element for mechanically or magnetically securing the contactless connector 402 to the electronic device 400. In the illustrated embodiment, the contactless connector 402 includes a first coupling element 480 and a second coupling element 482. In an exemplary embodiment, the first and second coupling elements 480, 482 are magnetic elements. Other types of coupling elements 480, 482 such as clips, latches, press-fit or interference fit components, Velcro, removably attachable adhesive, or other types of securing mechanisms, may be used in alternative embodiments. The first and second coupling elements 480, 482 are arranged on opposite sides of the alignment element 478. In an exemplary embodiment, the first and second coupling elements 480, 482 are vertically offset, such as with the first coupling element 480 closer to the first end 460 and the second coupling element closer to the second end 462. When the contactless connector is flipped between the first and second orientations (e.g., flipped 180 degrees), the first and second coupling elements 480, 482 swap positions. The first and second coupling elements 480, 482 are configured to be coupled to corresponding device coupling elements (not shown) of the mating connector interface of the electronic device 400 in multiple orientations.

The contactless connector 402 includes a first side power terminal 484 positioned at the first side 464 of the housing 450 and a second side power terminal 486 positioned at the second side 466 of the housing 450. The power terminals 484, 486 are configured to be electrically coupled to corresponding device power terminals (not shown) of the electronic device 400 to transfer power between the electronic device 400 and connector 402. In an exemplary embodiment, the power terminals 484, 486 have corresponding spring beams that are elastically deformed or compressed during mating with the electronic device 400 to ensure that an electrical connection is maintained therebetween. When the contactless connector 402 is flipped between the first and second orientations, the power terminals 484, 486 swap positions allowing coupling with the device power terminals in either orientation. The faces of the power terminals 484, 486 extend slightly beyond the front surface of the housing 450 to allow for direct physical contact with the device power terminals. The polarity of the power terminals 484, 486 may be reversed based on the orientation of the connector 402 with the electronic device 400.

According to other various embodiments, the contactless connector (102, 302, 402) and mating connector interface of the electronic device may be provided, in addition to the various aspects of the contactless data connectors described above, with a physical keying mechanism so that single orientation use is required.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc., are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A contactless connector comprising:
   a housing extending between a mating end and a termination end, the housing having a mating interface at the mating end configured to be coupled to a connector interface of an electronic device, the housing having a first side and a second side opposite the first side, the housing being reversibly coupled to the connector interface in both of a first orientation or a second orientation oriented 180 degrees relative to the first orientation, wherein the first side of said housing faces a first side of the connector interface in the first orientation and the second side of said housing faces a second side of the connector interface in the first orientation, and wherein the first side of said housing faces the second side of the connector interface in the second orientation and the second side of said housing faces the first side of the connector interface in the second orientation;
   first and second coupling elements at the first and second sides of said housing, respectively, the first and second coupling elements configured to be secured to corresponding coupling elements of the electronic device in both the first and second orientations;
   first and second power terminals at the first and second sides of said housing, respectively, the first and second power terminals being electrically coupled to corresponding device power terminals of the electronic device to supply power to the electronic device, wherein the first and second power terminals are configured to transfer power in both the first and second orientations; and
   a contactless data communication circuit board at least partially disposed within the housing, the contactless data communication circuit board having at least one connector contactless data communication chip configured to define a wireless communication channel with a device contactless data communication chip of the electronic device, wherein the at least one connector contactless data communication chip is configured to communicate with the electronic device in both the first and second orientations.

2. The contactless connector of claim 1, further comprising a sensor configured to sense the orientation of the housing relative to the connector interface of the electronic device to determine if the housing is in the first orientation or in the second orientation.

3. The contactless connector of claim 2, wherein a mode of operation of the at least one connector contactless data communication chip is switched between a transmit mode and a receive mode based on the sensed orientation of the housing.

4. The contactless connector of claim 2, further comprising a power circuit supplying power to the first and second power terminals, the sensor being operably coupled to the power circuit to switch polarity of the first and second power terminals based on the sensed orientation of the housing.

5. The contactless connector of claim 1, wherein the first and second power terminals are hollow power terminals receiving and surrounding the first and second coupling elements.

6. The contactless connector of claim 1, wherein, in the first orientation, the first power terminal has a positive polarity and the second power terminal has a negative polarity, and wherein, in the second orientation, the first power terminal has a negative polarity and the second power terminal has a positive polarity.

7. The contactless connector of claim 1, wherein the first and second power terminals comprise a first side positive power terminal and a first side negative power terminal positioned at the first side of the housing, the contactless connector further comprising a second side positive power terminal and second side negative power terminal positioned at the second side of the housing, the power terminals being electrically coupled to corresponding device power terminals of the electronic device to supply power to the electronic device.

8. The contactless connector of claim 7, wherein the first coupling element is positioned between the first side positive power terminal and the first side negative power terminal, and wherein the second coupling element is positioned between the second side positive power terminal and the second side negative power.

9. The contactless connector of claim 7, further comprising a positive wire in the housing and a negative wire in the housing, the positive wire being spliced and electrically coupled to the first side positive power terminal and the second side positive power terminal, the negative wire being spliced and electrically coupled to the first side negative power terminal and the second side negative power terminal.

10. The contactless connector of claim 1, wherein the first and second coupling elements are magnetic coupling elements configured to be magnetically coupled to the corresponding coupling elements of the electronic device.

11. The contactless connector of claim 1, wherein the at least one connector contactless data communication chip comprises a first connector contactless data communication chip and a second contactless data connector communication chip, the first and second connector contactless data communication chips each operable in a mode of operation that is either a transmit mode or a receive mode, wherein, in the first orientation, the first connector contactless data communication chip is configured to define a first wireless data communication channel with a first device contactless data communication chip of the electronic device and the second connector contactless data communication chip is configured to define a second wireless data communication channel with a second device contactless data communication chip of the electronic device, and wherein in the second orientation, the first connector contactless data communication chip is configured to define the second wireless data communication channel with the second device contactless data communication chip of the electronic device and the second connector contactless data communication chip is configured to define the first wireless data communication channel with the first device contactless data communication chip of the electronic device.

12. The contactless connector of claim 11, further comprising a sensor configured to sense the orientation of the housing relative to the connector interface of the electronic device to determine if the housing is in the first orientation or in the second orientation, wherein the mode of operation of the first and second connector contactless data communication chips is controlled based on the sensed orientation of the housing.

13. The contactless connector of claim 12, wherein, when the sensor senses that the housing is in the first orientation, the first connector contactless data communication chip is operated in the transmit mode and the second connector contactless data communication chip is operated in the receive mode, and wherein, when the sensor senses that the housing is in the second orientation, the first connector contactless data communication chip is operated in the receive mode and the second connector contactless data communication chip is operated in the transmit mode.

14. The contactless connector of claim 12, wherein at least one of the first connector contactless data communications chip or the second connector contactless data communication chip comprises the sensor.

15. The contactless connector of claim 12, wherein the sensor is at least one of a proximity sensor or a current direction sensor.

16. The contactless connector of claim 11, wherein the contactless data communication circuit board includes a first surface and a second surface, the first connector contactless data communication chip being mounted to the first surface and the second connector contactless data communication chip being mounted to the second surface.

17. The contactless connector of claim 11, wherein an alignment element comprises a projection extending forward of a front of the housing, the first and second connector contactless data communication chips being at least partially disposed inside of the projection.

18. The contactless connector of claim 1, wherein the housing includes an alignment element at the mating interface, the alignment element configured to align the housing with the electronic device in a first orientation and in a second orientation.

19. The contactless connector of claim 1, further comprising at least one of a radio-frequency absorber or an electromagnetic interference shield.

20. The contactless connector of claim 1, wherein the termination end comprises a cable end configured to be terminated to an end of a cable.

* * * * *